Aug. 8, 1967     A. SOODALTER     3,334,377

MEAT TENDERIZING APPARATUS

Filed Dec. 5, 1966     3 Sheets-Sheet 1

INVENTOR.
ARNOLD SOODALTER

BY *Kenwood Ross*

ATTORNEY.

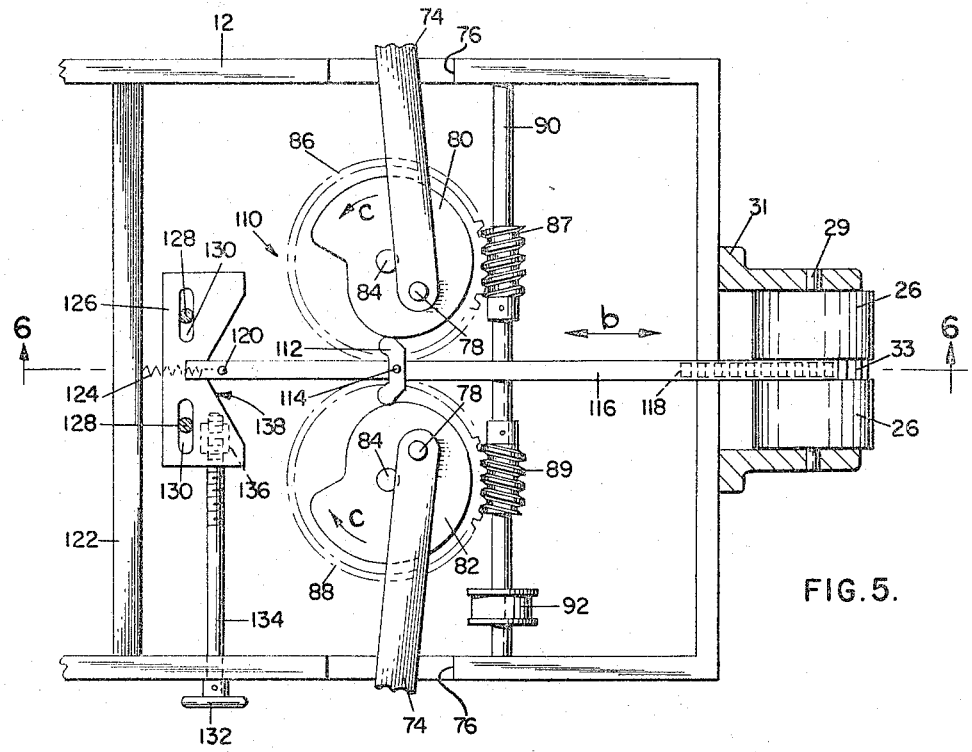
FIG.5.
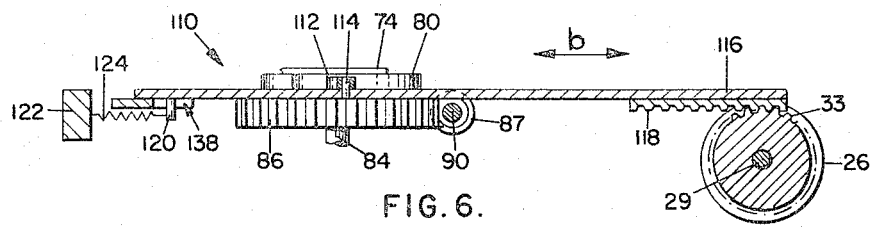
FIG.6.
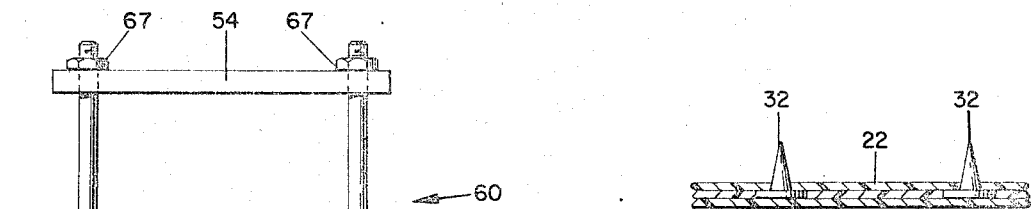
FIG.7.
FIG.8.
INVENTOR.
ARNOLD SOODALTER
BY Kenwood Ross
ATTORNEY.

Belt 22, moving in the direction of arrows a (in FIGS. 1 and 3), may take the form of a conveyor chain or equivalent and is preferentially provided with a plurality of spaced upwardly-projecting product-engaging fingers 32.

As shown in FIG. 8, the belt is preferably, but not necessarily, fabricated from a flexible plastic material which may be laminated in three plies about the product-engaging fingers so as to present smooth surfaces which are easy to clean and are free from such irregularities as might entrap pieces of the meat being processed.

Drum 29 is split, as shown, to facilitate the mounting of a gear 33 centrally of shaft 29 for purposes to appear.

Drum 28 need not be so split, but may be formed in the same manner to effect economies of production and to facilitate assembly by reason of parts interchangeability.

Belt tensioning means, as shown in FIG. 4, includes a hand wheel 34 positioned adjacent one end of frame 12 fixed to the outboard extremity of a horizontally-extending shaft 36 which mounts a bevel gear 38 adjacent its inboard extremity, such inboard extremity being journalled in a boss 40 fixed to and depending from table 10. Bevel gear 38 meshes with a similar gear 42 fixed adjacent the inboard extremity of a horizontally-extending threaded shaft 44, said inboard extremity also being journalled in boss 40.

Shaft 44 is threaded through an opening in a vertically-disposed plate 46 fixed to and extending between the inboard extremities of a pair of spaced, parallel, horizontally-extending slide rods 48, 48 which pass freely through provided openings in frame 12 and are fixed at their outboard extremities to bracket 30. The outboard end of shaft 44 butts against the end of frame 12.

By appropriate rotation of hand wheel 34, threaded shaft 44 is rotated to move bracket 30 toward or away from frame 12 to decrease or increase the tension on belt 22.

The opposite bracket 31 is fixed to frame 12 by any suitable means, not shown.

The food-conditioning assembly, generally indicated by 50, includes a supporting framework comprised of a pair of spaced parallel vertically upright support plates 52, 52, one disposed at each side of table 10, the upper ends of the support plates being interconnected by a horizontally-disposed cross head 54 extending therebetween and fixed thereto.

A pair of spaced vertically-disposed tine plates 56, 56 are disposed within the supporting framework inwardly of support plates 52 and parallel thereto and project upwardly from table 10 at opposite sides thereof so as to be disposed at opposite sides of belt 22.

Each tine plate 56 supports a bank of inwardly-facing horizontally-disposed tines 58 preferably, but not obligatorily, pointed at their innermost free extremities and which may be of round, oval, rectangular, square, or other cross-sectional configuration and which may be of either solid or hollow construction, depending on the product being processed.

Tines 58 on each tine plate 56 are disposed in equally-spaced horizontally and vertically-aligned rows, with the pointed ends of the tines of each row preferably being oppositely facing in alternating manner. That is, the adjacent tines in each horizontal row have oppositely-facing pointed ends, as have the adjacent tines of each vertical row, a feature allowing for more complete food product penetration.

Tines 58 of each tine plate 56 are slidably receivable and extendable through, in loose-fitting manner, equally vertically-spaced horizontally-extending slots 59 provided in the respective one of a pair of horizontally-spaced vertically-extending stripper plates 60, 60, there being one such stripper plate disposed inwardly of and parallel to each tine plate 56.

As shown in FIG. 7, each stripper plate 60 comprises a plurality of stacked spacer blocks 62 apertured at their opposite ends so as to be slidably receivable on spaced parallel and upright rods 64 fixed at their lower ends to a block 66 suitably secured to table 10 and fixed at their upper ends to cross head 54 as by nuts 68 threaded thereon.

The upper and lower planar surfaces of spacer blocks 62 are recessed or inset to provide slots 59 when the blocks are stacked.

The construction of rods and blocks makes for quick and easy dismantling and ready cleaning of the stripper plates.

Too, the structure is adapted for quick and ready modification in order to accommodate to meats of varying heights. By simply adding more tine plates, the construction can be modified.

Means for effecting an in and out reciprocating movement of tine plates 56 includes a pair of spaced vertically-aligned horizontally-extending primary drive arms 64, 64 fixed to the tine plates and projecting outwardly therefrom and connected at their outboard ends as by bolting 68 to a vertically-extending secondary drive arm 70, this latter being connected at its lower end as by bolting 72 to the outboard end of the respective one of a pair of horizontally-disposed crank arms 74, 74.

The crank arms of the pair extend inwardly through openings 76 in frame 12 and are connected at their inboard ends by eccentrically-mounted crank pins 78 to the respective one of a pair of spaced, horizontally-disposed, cams 80 and 82 fixed to the upper ends of vertically-extending shafts 84, 84 suitably journalled relative to frame 12.

Also mounted on shafts 84, 84 below cams 80 and 82 are a pair of spaced, horizontally-disposed, worm wheels 86 and 88 respectively which worm wheels 86 and 88 mesh with a pair of spaced oppositely-geared worm gears 87 and 89 respectively fixed to a common shaft 90 journalled in and extending horizontally and transversely relative to frame 12, said common shaft 90 carrying a pulley 92 at one of its ends. A drive belt 94 is entrained around pulley 92 and around a pulley 96 fixed to the output shaft 98 of a drive motor 100 mounted on a cross brace 102 carried by frame 12.

Drive motor 100 rotates common shaft 90 to rotate worm gears 87 and 89. The worm gears being oppositely geared, the worm wheels are rotated in opposite directions. As the worm wheels rotate, they carry crank arms 74 therewith, thereby to set up an in and out movement of the pair of secondary drive arms 70, the secondary drive arms in turn causing the tine plates to move toward and away from each other through primary drive arms 64. The opposite hands thus cancel out any thrust developed by the worms. As tine plates 56 reciprocate, the banks of tines are moved into and out of the meat which will have been positioned therebetween by the food conveying assembly, such movement and positioning of the meat being controlled and synchronized to the movement of the tine plates by the product feed control means, generally indicated by 110, and best illustrated in FIGS. 5 and 6 as including a double-arm follower 112 engageable with the cam surfaces of each of cams 80 and 82.

Follower 112, preferably of plastic to accommodate to wear, is pivotally mounted by a pin 114 to the upper surface of a horizontally and longitudinally-extending slide rod 116 slideably mounted on frame 12 and having an outboard extremity which overlies bracket 31 and gear 33.

Slide rod 116 mounts a rack 118 on the lower face of said outboard extremity, said rack meshing with gear 33. The opposite inboard extremity of the slide rod mounts a depending pin 120 connected to a frame cross member 122 by a tension spring 124.

A horizontally-disposed control plate 126 is slidably secured to the lower surface of table 10 adjacent the inboard end of slide rod 116 by a pair of bolts or screws 128, 128 which extend downwardly through a pair of

United States Patent Office

3,334,377
Patented Aug. 8, 1967

3,334,377
MEAT TENDERIZING APPARATUS
Arnold Soodalter, 134 Tanglewood Drive,
Longmeadow, Mass. 01106
Filed Dec. 5, 1966, Ser. No. 599,123
1 Claim. (Cl. 17—28)

ABSTRACT OF THE DISCLOSURE

A meat tenderizing apparatus having a conveyor for moving the meat to be tenderized with respect to and between a pair of interrelated meat-penetrating assemblies including opposed banks of tines having sliding rectilinear movement in directions transverse to the forward meat-advancing direction of movement of the conveyor, and cam means common to the conveyor and meat-penetrating assemblies for unisonly intermittently moving the banks of tines alternately between meat penetrating and nonpenetrating positions in timed relation with the intermittent and variably adjustable movement of the conveyor in a forward meat-advancing direction.

Cross references to related applications

This is a continuation-in-part of my copending application, Ser. No. 470,142, filed July 7, 1965.

Background of the invention (1) *Field of the invention.*—The invention relates to devices for tenderizing meat more suitable for eating by breaking down the fiber structure of the meat by means of opposed plates provided with projections for making multiple incisions into the meat as it moves therebetween.

(2) *Description of the prior art.*—A need for a satisfactory apparatus for and method of tenderizing a food product, such as meat, to make it more tender and readily edible has long been felt. Among the prior art structures, none has been known satisfactorily to provide the means whereby the tough fibers which make meat tough may be broken in the meat so that the muscle portions thereof will not be as thoroughly bound together as in the natural condition of the product.

Admittedly, it has been known to tenderize by subjecting the more fibrous meat to the cutting action of manually-actuated multi-knife cutters, but such prior art machines have been slow, cumbersome and laborious to operate, or have been of such complicated mechanism as to discourage if not preclude adequate cleaning.

Summary of the invention

Specifically, the invention envisions apparatus for breaking down the fiber structure of meat by subjecting it to a multiple-incision action by means of an apparatus incorporating a product-advancing or feeding mechanism interrelated with product-conditioning elements, with the movement of the feeding mechanism being timed according to the movement of the conditioning elements so as to insure accurate intermittent delivery of predetermined increments of the to-be-processed-meat to the conditioning elements.

One primary object is to provide an adjustable, stroke control means so as to allow a variable preselected increment of product feed to the conditioning elements while in motion.

Another object is to provide means for operating tenderizing tools in manner such that same will be penetrated into the food at one point of time in the machine cycle and will be withdrawn therefrom at another moment thereof, the action of the tools being so synchronized with the food conveying means that the entry of the tools in successive strokes is at different points along the food.

Another object is to provide a conveyor means which moves in a forward, food-advancing direction only so as to avoid the feature in a reciprocating arrangement, when the meat is first engaged and then is disengaged preparatory to taking another bite and advancing the meat another increment. By the improved design, the meat once engaged by the conveyor means remains so engaged until the tenderizing operation has been completed allowing for a more positive control.

Brief description of the drawings

FIG. 5 is an enlarged, fragmentary view, in top plan, similar to FIG. 4, of certain elements of the feed control means;

FIG. 6 is a view, in cross section, on the line 6—6 of FIG. 5, with parts omitted for clarity;

FIG. 7 is a broken view, in side elevation, of the stripper plate means; and

FIG. 8 is an enlarged, fragmentary view, in cross section, of the belt of the conveyor system.

Description of the preferred embodiment

Figure 1:
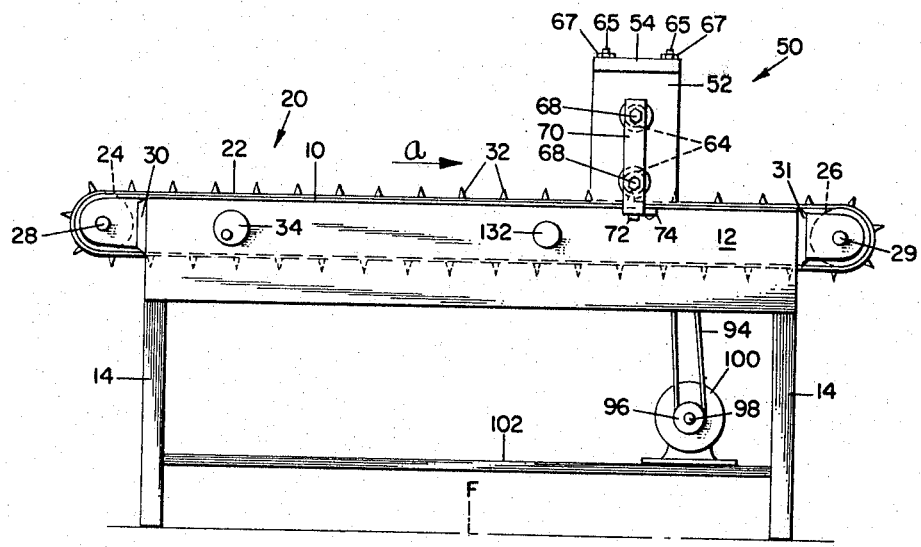
FIG. 1 is a view, in side elevation, of one form of apparatus embodying the inventive concept.
Figure 2:
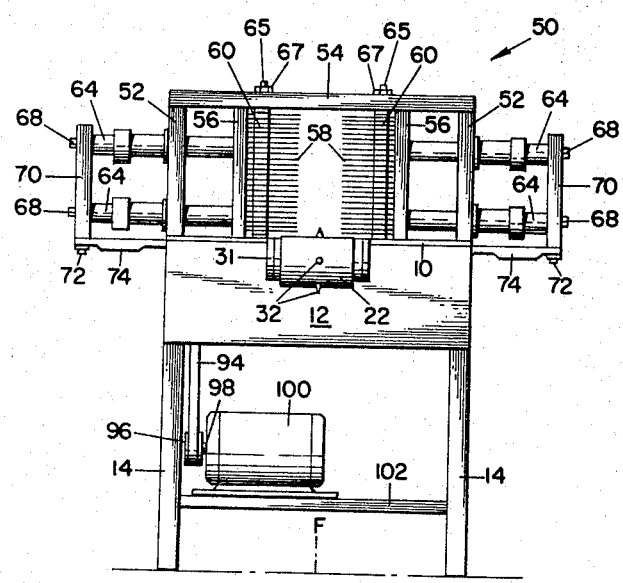
FIG. 2 is a view, in end elevation, of the FIG. 1 apparatus, as seen from the right hand or discharging end thereof.
Figure 3:
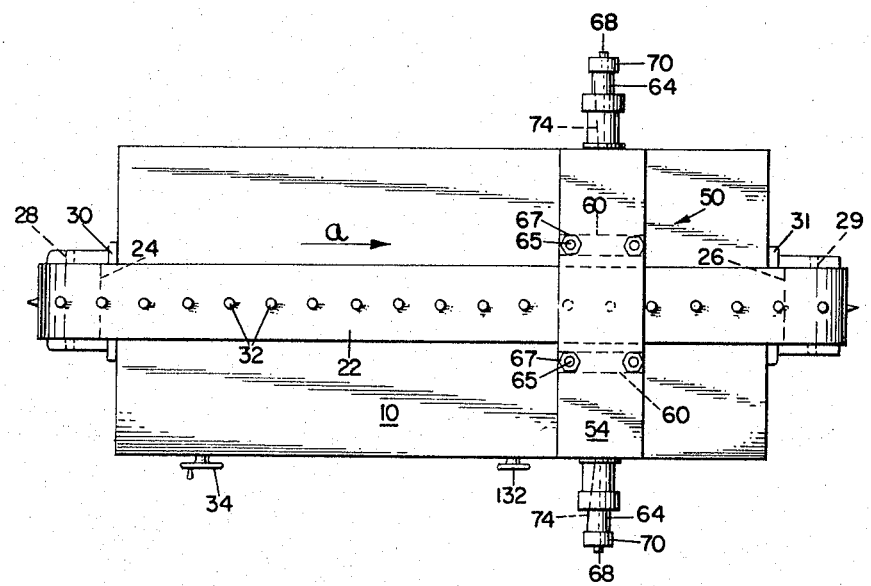
FIG. 3 is a view, in top plan, of the FIG. 1 apparatus.
Figure 4:
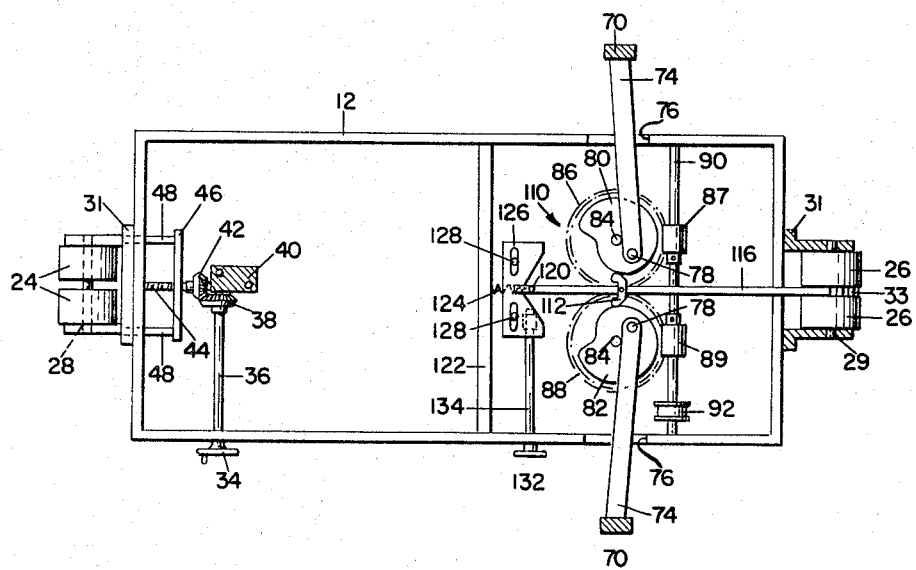
FIG. 4 is a view, in top plan, similar to FIG. 3, with certain parts broken away or in section or omitted for purposes of clarity.

A cam means serves to impart a unidirectional linear movement to the meat and a crank means serves to impart opposite linear movements to banks of tines on opposite sides of the food and in directions transverse to the direction of movement of the food for motivating the banks of tines toward and into and away from and out of the food.

A table-like structure supports the operating components consisting of a food conveying assembly, a food conditioning assembly, and a control means for synchronizing the movements of the two said assemblies, all upwardly of a floor or base F, and is characterized by a horizontally-extending table 10 mounted upon a generally-rectangular open frame 12 and supported upwardly of the floor by the usual vertically-disposed legs 14.

The food conveying assembly, generally indicated by 20, includes an endless belt or chain 22 entrained about a pair of spaced horizontally-disposed split drums 24 and 26, which drums are mounted on shafts 28 and 29 journalled for rotative movement each adjacent a respective opposite end of table 10 by means of brackets 30 and 31 respectively strategically-positioned relative to frame 12 so that the uppermost peripheral surfaces of the drums are coplanar with the upper planar surface of table 10 with the upper run of the endless belt being supported by and movable along the table and over the drums.

aligned transversely-extending slots 130, 130 provided in the control plate.

Transverse or side-to-side movement of the control plate is effected by rotation of a handwheel 132 fixed to the outboard end of a horizontally and transversely-extending threaded shaft 134 which has its inboard end threadedly engaged in a depending boss 136 fixed to the lower surface of the control plate.

A V-notch 138 provided on the leading edge of the control plate opens toward the depending pin 120 on the slide rod.

Rotation of handwheel 132 accordingly moves the control plate, thereby moving V-notch 138 relative to pin 120. Thus, the slide rod is moved in the directions indicated by the arrows b in FIGS. 5 and 6.

Such movement of the slide rod changes the position of follower 112 relative to cams 80 and 82. By such change of position, the stroke of the slide rod is varied whereby the incremental movements of the belt are changed.

As cams 80 and 82 rotate in the direction of arrows c, they eventually strike follower 112 thereby driving the slide rod forwardly whereby the rack meshing with gear 33 causes drum 33 to rotate to move the belt forwardly in feeding direction.

A slight allowance for wobble in follower 112 permits compensation for early and late arrival of cams 80 and 82.

Movement of the rack to the right as viewed in the drawings sets up an indexing rotation of drum 26 through gear 33 to move the conveying belt in a feeding or advancing direction in timed increments coinciding with those increments of time during which the tines on tine plates 56 are retracted from the food.

By adjusting the position of follower 112 relative to cams 80 and 82, a larger or smaller increment of travel of the conveying belt may be obtained.

Means for precluding non-feeding movement of gear 33 during movement of the slide rod to the left, under the impetus of spring 124, as the slide rod prepares for its next feeding stroke, may comprise such as a uni-directional clutch, not shown, which may be of any commercially available type.

The apparatus is adapted to be power driven at a relatively high speed, the reciprocating tines and the fixed stripper plates being so arranged that, on each return stroke of the tines, the stripper plates strip the food product from the tines and permit the food product to be advanced an adjustably predetermined increment so that, on the next operating stroke, the tines will penetrate the food product at a different location.

The design broadly teaches the concept of two horizontally-mounted sets of tine plates appropriately synchronized and power driven so as to set up a motion such as to generate a pair of diametrically-opposed working forces via a symmetrical system, thereby allowing excellent power balance and torque distribution as a result of dual identity in motion.

By the use of a crank system to actuate the tine plates, the tines can be retracted further into the stripper plates for a gain in dwell time.

While the structure is exemplified as being cam operated, it is to be understood that it could be hydraulically or pneumatically operated when and as manufacturing and/or operating considerations may dictate.

Too, while the tines are shown as being horizontally-disposed so as to penetrate the meat at opposite sides, they could be vertically-disposed so as to penetrate the meat at the top and bottom, and conceivably could be otherwise disposed, such as angularly, so as to penetrate the meat at any other areas as may be desired. Such alternate arrangement conceivably might be preferable in the case of tenderizing top butts and top rounds.

I claim:

A food-conditioning mechanism comprising:

(a) a support;
(b) food feed means including:
   (1) a pair of rollers each fixed to a shaft journalled in said support;
   (2) a conveyor belt entrained around said rollers for uni-directional movement in forward food-advancing direction relative to said support;
   (3) A plurality of spaced food-engaging teeth projecting upwardly from the conveyor belt;
(c) a pair of interrelated food-penetrating assemblies including:
   (1) a pair of stripper plates each mounted at an opposite side of the conveyor belt of said food feed means on and vertically-upwardly of said support and cooperantly defining a food-conditioning area therebetween and upwardly of the conveyor belt;
   (2) a pair of tine plates each positioned outboard of a respective stripper plate and slidably mounted upon said support;
   (3) a bank of inwardly-facing horizontally-disposed free-ended tines carried by each tine plate;
   (4) with each tine plate and bank of tines having sliding rectilinear movement transverse to the forward food-advancing direction of movement of the food feed means between an inboard food-penetrating position of adjacency to the respective stripper plate with the free ends of the tines of the bank extending through the stripper plate and into the food-conditioning area and the food therein and an outboard food-non-penetrating position of distance from the stripper plate with the free ends of the tines of the bank extending outboard of the food-conditioning area and the food therein;
(d) motivating means common to said food feed means and food-penetrating assemblies for intermittently moving unisonly the tine plate and bank of tines of each food-penetrating assembly alternately between food-penetrating and food-non-penetrating positions in timed relation with the intermittent movement of the conveyor belt of said food feed means in a forward food-advancing direction and including:
   (1) a pair of spaced coplanar worm wheels each fixed to a shaft journalled in said support;
   (2) a pair of spaced axially-aligned oppositely-geared worm gears fixed upon a common shaft journalled in said support, each form gear meshing with a respective one of said worm wheels;
   (3) power and drive means for imparting rotative movement to the common shaft and worm gears;
   (4) a pair of crank arms each connected at one end to a tine plate of a respective food-penetrating assembly and eccentrically connected at its opposite end to a respective one of said worm wheels for effecting reciprocation of the tine plates and bank of tines in opposite in and out directions as the worm wheels are rotated;
   (5) a rise cam fixed to each of said worm wheel shafts and rotatable therewith;
   (6) a slide bar slidably fixed to said support;
   (7) a cam follower on the slide bar engageable by the rise cams;
   (8) a pinion fixed to a shaft of one of the conveyor belt rollers;
   (9) a rack fixed to the slide bar and meshing with said pinion;
   (10) clutch means on the pinion for precluding rotation of the pinion and shaft and conveyor roller in a rearward food-non-advancing direction;

(11) the rise cams urging the slide bar in a certain direction for rotating the pinion and its roller and the conveyor belt in a forward food-advancing direction as the crank arms are moving the tine plates and banks of tines of each food-penetrating assembly out of the food product.

References Cited

UNITED STATES PATENTS

| | | | |
|---|---|---|---|
| 1,987,349 | 1/1935 | Rasmussen | 17—28 |
| 2,971,216 | 2/1961 | Gwilliam et al. | 17—25 |

LUCIE H. LAUDENSLAGER, *Primary Examiner.*